United States Patent
Herse et al.

(10) Patent No.: US 12,130,225 B2
(45) Date of Patent: Oct. 29, 2024

(54) ROTARY SEAL TESTING APPARATUS

(71) Applicant: GM Cruise Holdings LLC, San Francisco, CA (US)

(72) Inventors: Nathaniel Barrett Herse, San Francisco, CA (US); Wesley Newhouse, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 296 days.

(21) Appl. No.: 17/742,558

(22) Filed: May 12, 2022

(65) Prior Publication Data
US 2023/0366807 A1    Nov. 16, 2023

(51) Int. Cl.
*G01N 19/02*    (2006.01)

(52) U.S. Cl.
CPC .................................. *G01N 19/02* (2013.01)

(58) Field of Classification Search
None
See application file for complete search history.

(56) References Cited

U.S. PATENT DOCUMENTS

| | | | |
|---|---|---|---|
| 3,180,135 A * | 4/1965 | Cain, Jr. ............. | G01M 3/3218 73/9 |
| 10,989,641 B2 * | 4/2021 | Hou ......................... | G01N 3/14 |
| 2021/0325888 A1 * | 10/2021 | Mandel-Senft ........ | G01R 31/66 |

* cited by examiner

*Primary Examiner* — Brandi N Hopkins
*Assistant Examiner* — Nigel H Plumb
(74) *Attorney, Agent, or Firm* — Michael DiCato (57) ABSTRACT

The disclosed technology provides solutions for measuring seal characteristics and in particular, for precisely measuring frictional characteristics of a rotary seal. In some aspects, a seal testing apparatus of the disclosed technology can include a motor coupled to a proximal end of a shaft, a rotator coupled to a distal end of the shaft, and a housing disposed around an exterior surface of the rotator, wherein the housing is configured to removably receive at least one seal. In some aspects the seal-testing apparatus can further include a torque transducer coupled to the shaft, wherein the torque transducer is configured to measure a torque output of the motor.

20 Claims, 5 Drawing Sheets

ROTARY SEAL TESTING APPARATUS

BACKGROUND

1. Technical Field

The disclosed technology provides solutions for testing seals, such as those used in autonomous vehicle (AV) applications (e.g., rotary seals) and in particular, provides instrumentation for testing rotary seal properties, such as frictional characteristics.

2. Introduction

Autonomous vehicles (AVs) are vehicles having computers and control systems that perform driving and maintenance tasks conventionally performed by a human driver. In some AV deployments, such as when AVs are deployed in fleets—at scale—cost effective charging solutions are needed to maintain vehicle operations. Conventional robotic charging approaches, which can rely on electromagnetic braking mechanisms to facilitate vehicle-charger coupling, are often difficult to maintain, and too expensive and complicated to be deployed at scale.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The disclosed technology provides solutions for testing component seals, such as rotary seals. As discussed herein, several of the provided examples relate to the use of rotary seals in the context of autonomous vehicle (AV) deployments. However, it is understood that aspects of the disclosed technology can be used for testing seals intended for use in other applications without departing from the scope of the disclosed technology.

Rotary seals are commonly used to prevent the ingress of moisture and debris into components, such as rotary actuators and sensors, commonly used in robotics. For such uses, it is desirable to understand how the seals may interact with the associated component parts (e.g., sensor housing), such as by accurately measuring frictional forces for different seal sizes, material compositions, and finish types.

Aspects of the disclosed technology provide solutions for accurately measuring rotary seal characteristics by providing a rotary-seal testing apparatus configured to measure frictional attributes of a seal interface for different seal types/configurations. In some aspects, a seal-testing apparatus can be configured to precisely measure an amount of torque needed to rotate a shaft before and after placement of a seal into the testing apparatus. By measuring the differences in the amount of torque required to reach a steady state (e.g., a constant angular velocity), frictional contributions of the seal interface can be determined, thereby enabling an inexpensive and convenient means by which seals of different sizes and/or material compositions can be tested.

A seal interface, such as that of a rotating senor array, can be mimicked by fixing a rotary seal into a stationary housing component of the testing apparatus, and by rotating component of the testing apparatus (e.g., a rotator) using a shaft that is rotationally actuated using a motor. Depending on the desired implementation, torque measurements may be made using the motor and/or a motor controller, and/or using a torque transducer that is coupled to the shaft.

Figure 1:
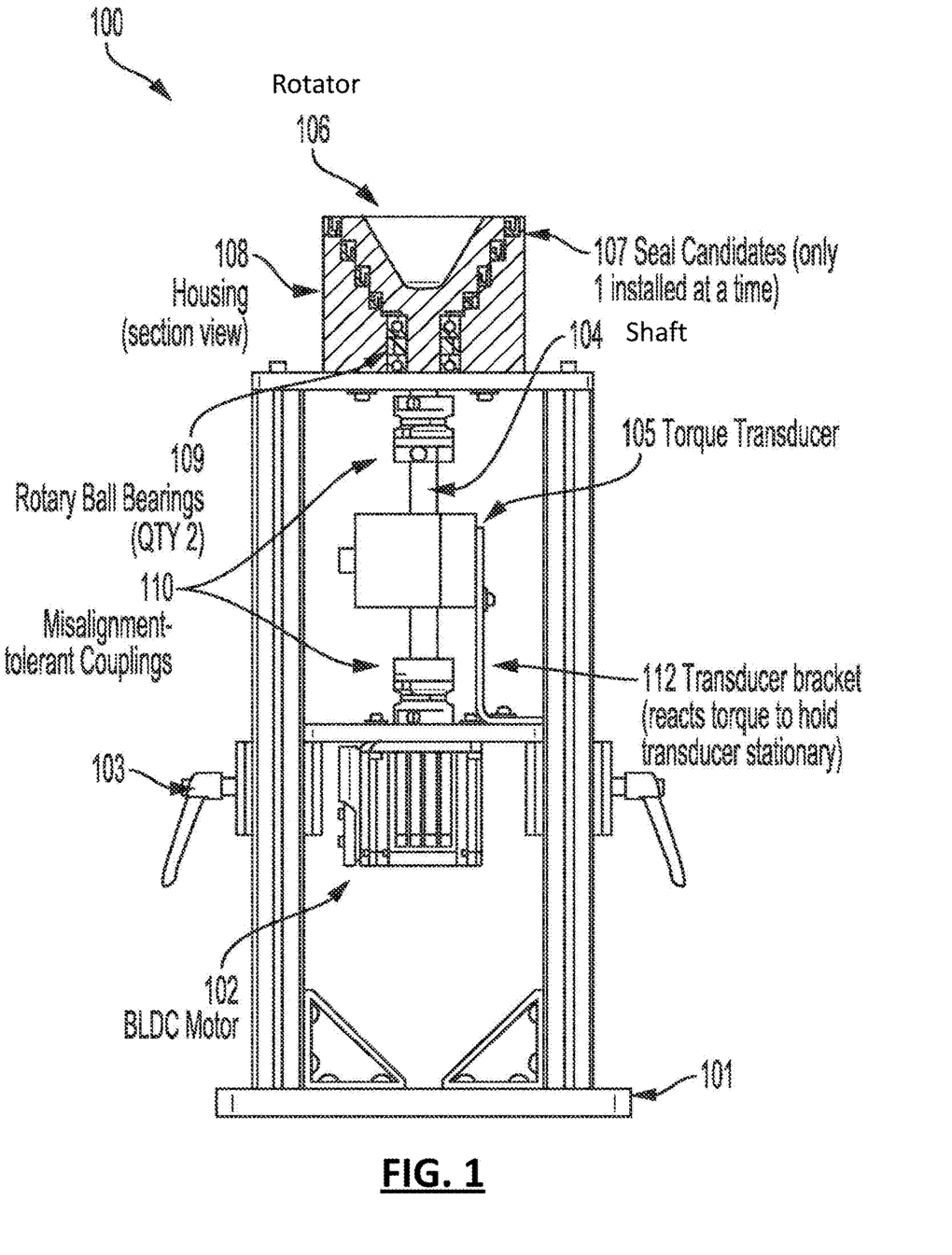
FIG. 1 illustrates an example seal-testing apparatus, according to some aspects of the disclosed technology.

FIG. 1 illustrates an example seal-testing apparatus 100 setup of the disclosed technology. The seal-testing apparatus 100 includes multiple components that are mounted onto a frame 101, including a motor 102, which is affixed to a shaft 104 at a proximal end, and affixed to a rotator 106 at a distal end. In the example, of FIG. 1, the motor 102 is affixed to the proximal end of shaft 104, using a misalignment-tolerant coupling 110. In turn, the shaft 104 is affixed to the rotator 106 via a misalignment-tolerant coupling 110, e.g., at the distal end of shaft 104.

In operation, rotary seals can be inserted into testing apparatus 100 by placing the seal candidate(s) 107 into an interior portion of housing 108, which is disposed around an exterior surface of the rotator 106. When activated, motor 102 induces rotation of shaft 104, thereby rotating the rotator 106 against an interior surface of the inserted seal. An amount of force (torque) required to rotate the shaft 104 at a constant angular velocity can be determined based on measurements taken at/by the motor and/or by a torque transducer 105 that is coupled to the shaft 104. As illustrated in the example of FIG. 1, the torque transducer 105 can be affixed to the frame 101, e.g., using a bracket (transducer bracket), that prevents transducer motion due to rotational forces imparted rotation of shaft 104.

In some aspects, seal placement/removal can be facilitated by separation of components along the shaft. For example, rotator 106 can be easily lifted up and out of the housing, e.g., by decoupling the shaft 104 from the motor 102 and/or by decoupling one or more of the couplings 110. The mating of the interface between the exterior of the rotator 106 and the interior surface of the seal can be controlled/aligned using bearings, such as ball bearings 109. Additionally, the addition or removal of components from the shaft 104, can be facilitated by separation of frame 101, e.g., that is controlled by handles 103.

Depending on the desired implementation, frictional characteristics of a given seal interface can be tested by first measuring the forces (torque) necessary to rotate the shaft 104 without the seal, and then measuring the rotational force/torque required to rotate the shaft 104 with the seal in place, e.g., to compute a difference in rotational force characteristics. For example, the amount of torque attributable to frictional forces provided by the seal interface can be computed using the expression of equation (1):

$$\tau_{seal} = \tau_{seal+shaft} - \tau_{shaft} \quad (1)$$

where $\tau_{seal}$ represents the amount of torque exerted by the motor to overcome frictional forces attributable to the seal interface, $\tau_{seal+shaft}$ represents an amount of torque exerted by the motor to rotate the shaft in the presence of the seal interface, and $\tau_{shaft}$ represents the amount of torque exerted by the motor to rotate only the shaft.

The static friction associated with a given seal (and the resulting seal interface) can be represented by a maximum force/torque needed to affect rotation of the shaft 104, whereas kinetic friction associated with the seal can be represented by the additional torque needed to maintain a constant (or near constant) rotational velocity of the shaft 104. A process for measuring frictional characteristics of a given seal using testing apparatus 100 is discussed in further detail with respect to FIG. 2.

Depending on the desired implementation, different types of motors may be used. For example, motor 102 may be a brushless direct current (DC) motor, or may be any other type of motor suitable for rotating shaft 104, without departing from the scope of the disclosed technology.

Figure 2:
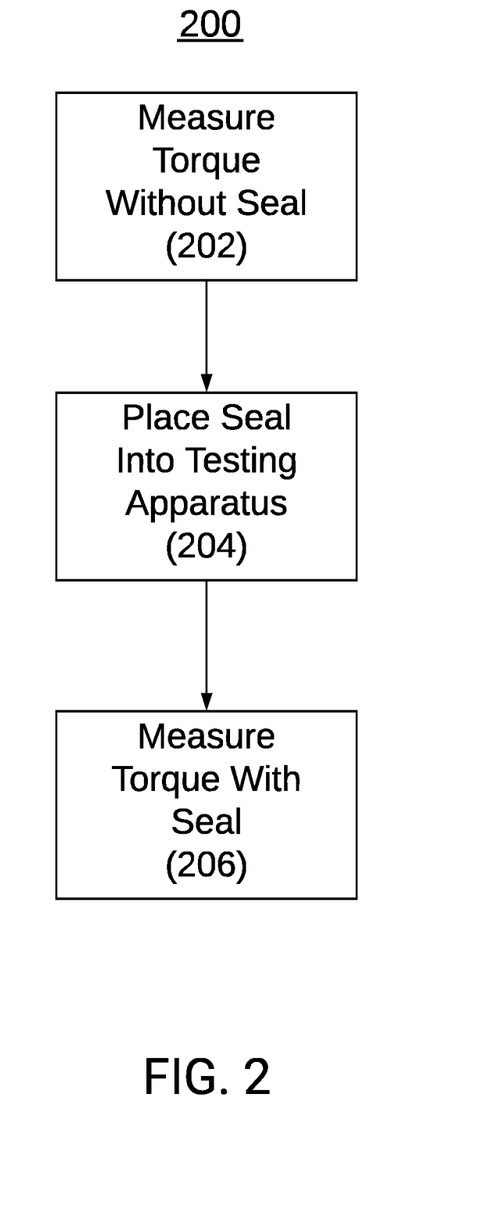
FIG. 2 illustrates a conceptual block diagram of a process for testing frictional properties of a rotary seal, according to some aspects of the disclosed technology.

FIG. 2 illustrates a conceptual block diagram of a process 200 for testing frictional properties of a rotary seal. The process 200 begins with step 202, in which torque measurements are taken by the testing apparatus (e.g., testing apparatus 100), without the presence of a seal. The torque measurement of step 202 indicates a baseline torque exerted by the motor to induce rotation in the shaft and rotator. That is, the torque measurement of step 202 indicates the torque exerted by the motor to rotate the shaft in the absence of contact with a seal interface.

At step 204, the process 200 includes placing a seal into the testing apparatus. As discussed above with respect to FIG. 1, the seal to be tested can be inserted into the housing, e.g., that is affixed to a top surface of a frame of the testing apparatus. Once inserted, the rotator and shaft can be shifted into position, e.g., by inserting the rotator back into the inner volume of the housing.

At step 206, the process 200 can include measuring a torque required to rotate the shaft about a surface that interfaces with the seal. The torque measurement of step 206 can include a peak torque measurement, e.g., that corresponds with a static friction of the seal, as well as a static (or steady state) torque measurement, e.g., that corresponds with a kinetic friction of the seal. The measured frictional characteristics can depend on a number of factors, including a size of the seal, a material composition of the seal, a finish of the seal, and/or a finish of the rotator that interfaces with the seal.

Figure 3:
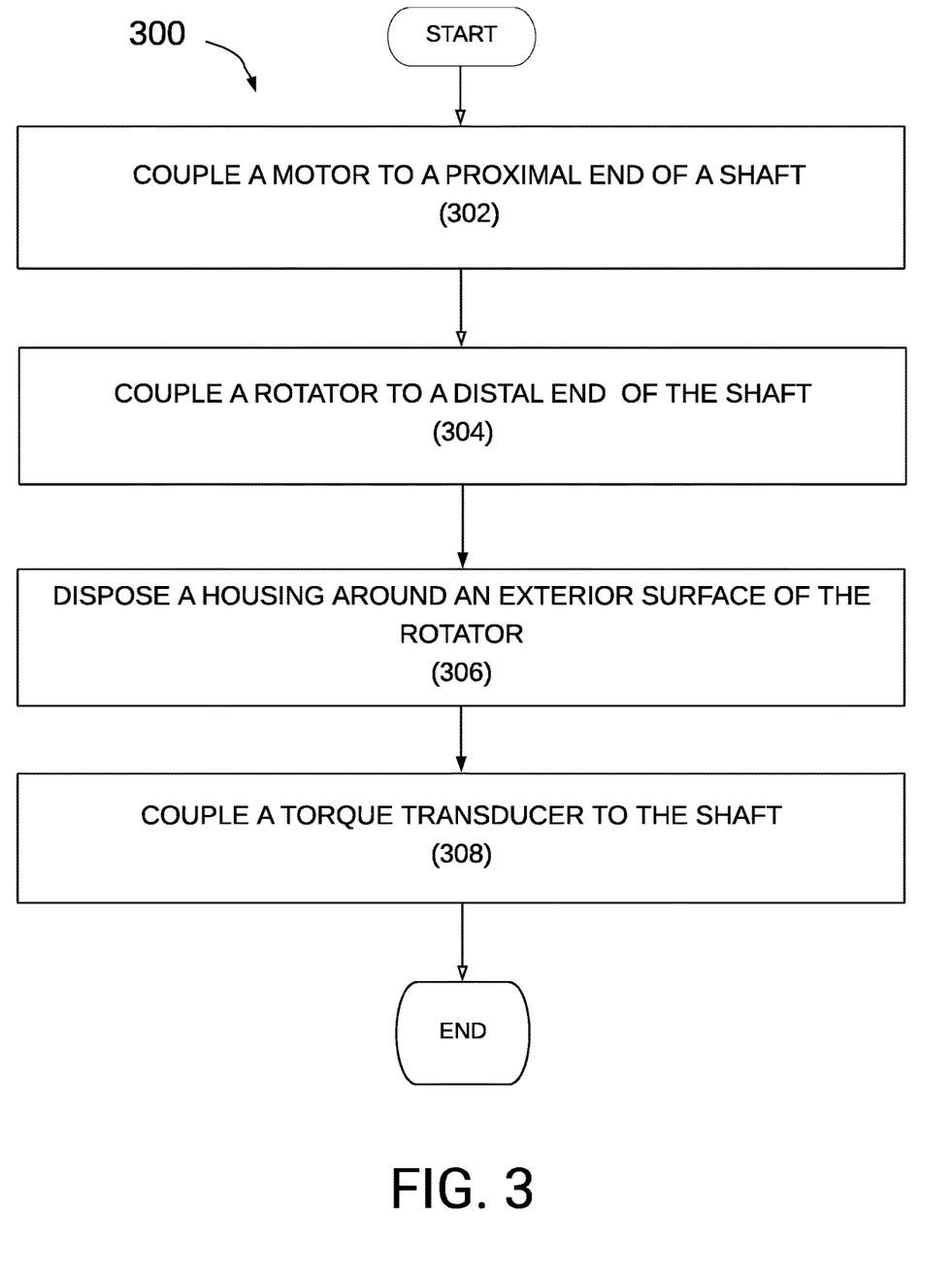
FIG. 3 illustrates a conceptual block diagram of an example process for assembling a rotary-seal testing apparatus, according to some aspects of the disclosed technology.

FIG. 3 illustrates a conceptual block diagram of an example process 300 for assembling a rotary seal testing apparatus. The process 300 begins with step 302 which includes coupling a motor to a proximal end of a shaft. At step 304, the process 300 includes coupling a rotator to a distal end of the shaft. At step 306, the process 300 includes disposing a housing around an exterior surface of the rotator, wherein the housing is configured to removably receive at least one seal. And at step 308, the process 300 includes coupling a torque transducer to the shaft, wherein the torque transducer is configured to measure a torque output of the motor.

Figure 4:
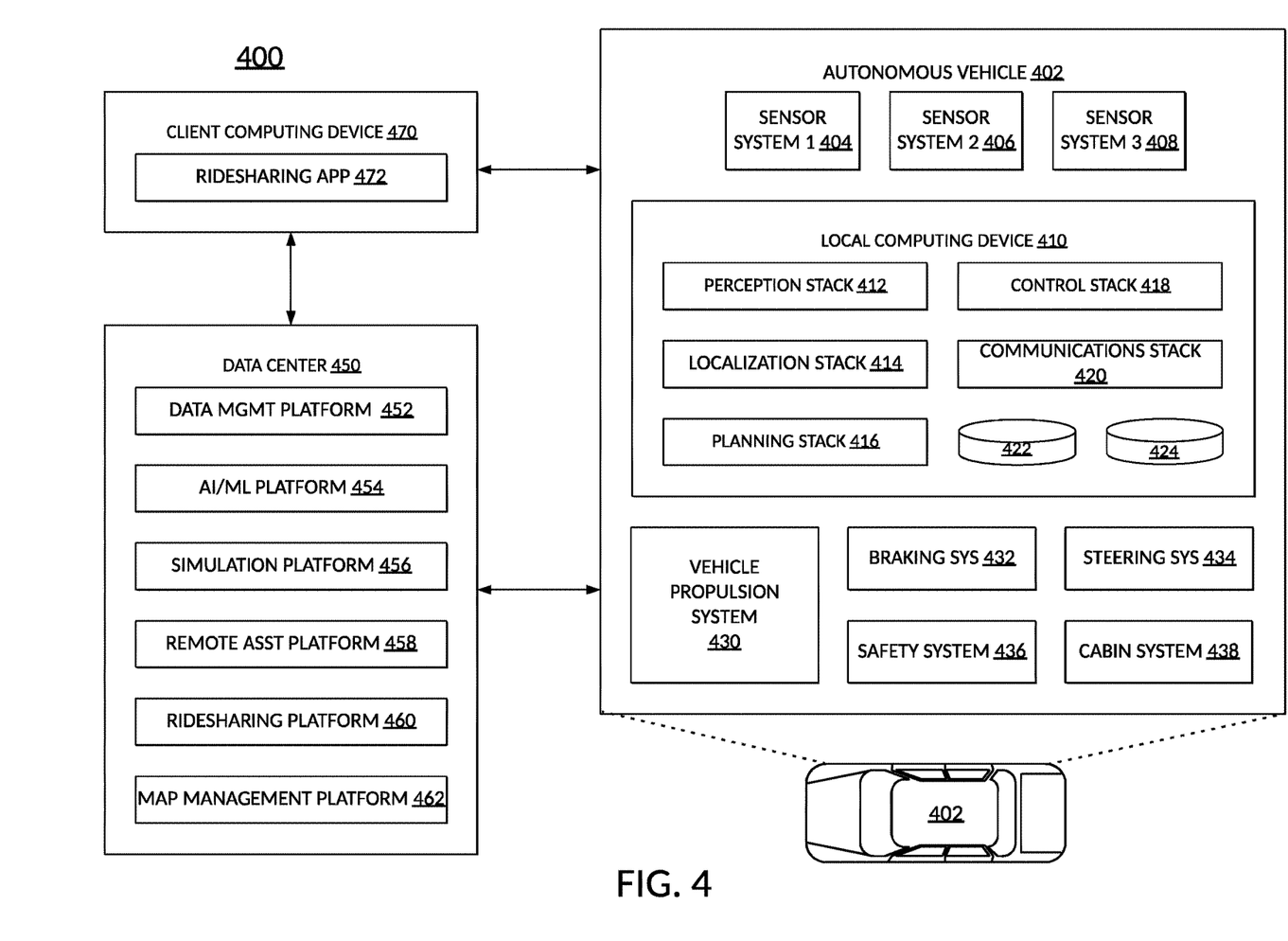
FIG. 4 illustrates an example system environment that can be used to facilitate AV dispatch and operations, according to some aspects of the disclosed technology.

Turning now to FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill in the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces, e.g., Graphical User Interfaces (GUIs), Voice User Interfaces (VUIs), etc., for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
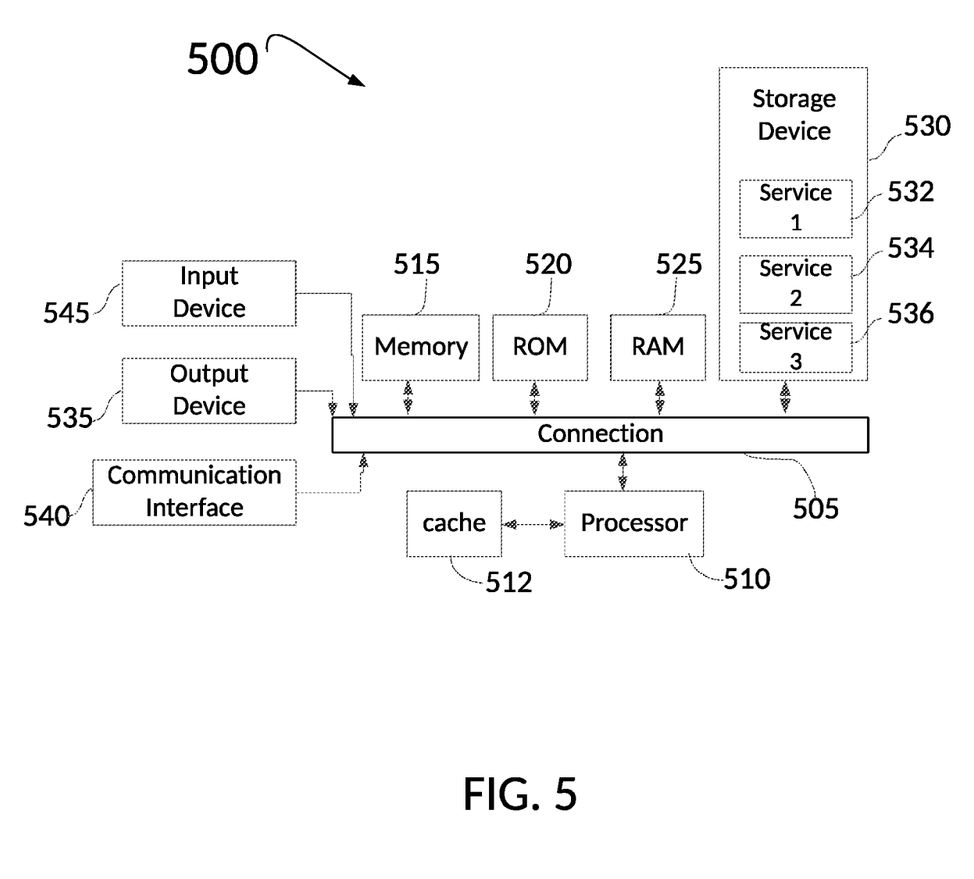
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up local computing device 410, remote computing system 450, a passenger device executing the rideshare app 472, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based techniques can vary depending on the desired implementation. For example, machine-learning classification schemes can utilize one or more of the following, alone or in combination: Ensemble of Regression Trees, hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A seal-testing apparatus, comprising:
a motor coupled to a proximal end of a shaft;
a rotator coupled to a distal end of the shaft;
a housing disposed around an exterior surface of the rotator, wherein the housing is configured to removably receive at least one seal;
and a torque transducer coupled to the shaft, wherein the torque transducer is configured to measure a torque output of the motor.

2. The apparatus of claim 1, wherein the motor is affixed to a frame, and wherein the torque transducer is coupled to the frame via at least one bracket.

3. The apparatus of claim 2, wherein the housing is coupled to a top-surface of the frame.

4. The apparatus of claim 1, wherein the motor is coupled to the proximal end of the shaft via a first misalignment-tolerant coupling.

5. The apparatus of claim 4, wherein the rotator is coupled to the distal end of the shaft via a second misalignment-tolerant coupling.

6. The apparatus of claim 1, wherein the rotator is configured to be removably separated from the shaft.

7. The apparatus of claim 1, wherein the motor is a brushless direct current (DC) motor.

8. The apparatus of claim 1, wherein the motor is configured to measure an amount of torque exerted on the shaft.

9. The apparatus of claim 1, further comprising:
at least one set of alignment bearings disposed around the distal end of the shaft, and wherein the alignment bearings are affixed between the shaft and the housing.

10. A method of assembling a seal-testing apparatus, comprising:
coupling a motor to a proximal end of a shaft;
coupling a rotator to a distal end of the shaft;
disposing a housing around an exterior surface of the rotator, wherein the housing is configured to removably receive at least one seal; and
coupling a torque transducer to the shaft, wherein the torque transducer is configured to measure a torque output of the motor.

11. The method of claim 10, wherein the motor is affixed to a frame, and wherein the torque transducer is coupled to the frame via at least one bracket.

12. The method of claim 11, wherein the housing is coupled to a top-surface of the frame.

13. The method of claim 10, wherein the motor is coupled to the proximal end of the shaft via a first misalignment-tolerant coupling.

14. The method of claim 13, wherein the rotator is coupled to the distal end of the shaft via a second misalignment-tolerant coupling.

15. The method of claim 10, wherein the rotator is configured to be removably separated from the shaft.

16. The method of claim 10, wherein the motor is a brushless direct current (DC) motor.

17. The method of claim 10, wherein the motor is configured to measure an amount of torque exerted on the shaft.

18. The method of claim 10, further comprising:
disposing at least one set of alignment bearings around the distal end of the shaft, and wherein the alignment bearings are affixed between the shaft and the housing.

19. The method of claim 10, further comprising:
placing a rotary seal onto the housing; and
reading a first torque measurement from the torque transducer.

20. The method of claim 19, further comprising:
reading a second torque measurement from the motor; and
comparing the first torque measurement with the second torque measurement.

* * * * *